(12) United States Patent
Coplestone (10) Patent No.: US 11,193,610 B2
(45) Date of Patent: Dec. 7, 2021

(54) SEAL ASSEMBLY

(71) Applicant: Poulton Technologies Limited, Marlborough (GB)

(72) Inventor: Rodney Coplestone, Marlborough (GB)

(73) Assignee: POULTON TECHNOLOGIES LIMITED, Marlborough (GB)

( * ) Notice: Subject to any disclaimer, the term of this patent is extended or adjusted under 35 U.S.C. 154(b) by 239 days.

(21) Appl. No.: 16/338,062

(22) PCT Filed: Oct. 12, 2017

(86) PCT No.: PCT/GB2017/053086
§ 371 (c)(1),
(2) Date: Mar. 29, 2019

(87) PCT Pub. No.: WO2018/069713
PCT Pub. Date: Apr. 19, 2018

(65) Prior Publication Data
US 2019/0234542 A1 Aug. 1, 2019

(30) Foreign Application Priority Data
Oct. 12, 2016 (GB) ..................... 1617305

(51) Int. Cl.
*F16L 27/12* (2006.01)
*F16L 19/065* (2006.01)
(Continued)

(52) U.S. Cl.
CPC .......... *F16L 19/065* (2013.01); *F16L 19/061* (2013.01); *F16L 19/083* (2013.01); *F16L 25/12* (2013.01); *F16L 27/1274* (2019.08)

(58) Field of Classification Search
CPC ......... F16L 19/103; F16L 19/12; F16L 19/10; F16L 19/08; F16L 19/065; F16L 19/061;
(Continued)

(56) References Cited

U.S. PATENT DOCUMENTS 6,145,893 A * 11/2000 Kuo ..................... F16L 27/026
285/302
2002/0043804 A1 4/2002 Shen et al.
(Continued)

FOREIGN PATENT DOCUMENTS

BR PI 1100401-0 A2 4/2013
CN 101896757 11/2010
(Continued)

OTHER PUBLICATIONS

Great Britain Combined Search and Examination Report dated Mar. 27, 2017 issued in Great Britain Patent Application No. GB1617305. 6, 9 pp.

(Continued)

*Primary Examiner* — Aaron M Dunwoody
(74) *Attorney, Agent, or Firm* — Nixon & Vanderhye P.C.

(57) ABSTRACT

A seal assembly has a connector body with a first section and a second section, movable relative to one another. The first section and the second section each has an open end configured for receiving the free end of a pipe. The open end of the first and second sections are each configured for sealing engagement with the free end of a respective pipe. The seal assembly is movable between a first condition, in which the second section assumes a retracted position relative to the first section, and a second condition in which the second section assumes an extended position relative to the first section. A seal member is provided for creating a seal between the first section and the second sections in said first and second conditions. First and second adaptors are provided, each for association with a respective one of said first and second sections of the connector body and configured for securing at the free end of a respective pipe. First and second mechanical interlock arrangements are provided, each for association with a respective one of said first and (Continued)

second adaptors, and each configured for driving the respective adaptor in the direction of the connector body.

21 Claims, 5 Drawing Sheets

(51) Int. Cl.
  *F16L 19/06* (2006.01)
  *F16L 19/08* (2006.01)
  *F16L 25/12* (2006.01)

(58) Field of Classification Search
  CPC ....... F16L 19/083; F16L 19/086; F16L 25/10; F16L 25/12; F16L 27/12; F16L 27/127; F16L 27/1275; F16L 27/12751
  USPC ............... 285/298, 382, 382.7, 917, 342
  See application file for complete search history.

(56) References Cited

U.S. PATENT DOCUMENTS

| | | | |
|---|---|---|---|
| 2008/0272594 A1 | 11/2008 | Phillipps | |
| 2015/0260318 A1 | 9/2015 | Goess-Saurau et al. | |

FOREIGN PATENT DOCUMENTS

| | | |
|---|---|---|
| CN | 102203490 | 9/2011 |
| CN | 204284739 U | 4/2015 |
| DE | 27 33 086 | 2/1979 |
| EP | 0 053 901 | 6/1982 |
| EP | 0 210 714 | 2/1987 |
| EP | 0 272 771 | 6/1988 |
| EP | 0 461 741 | 12/1991 |
| EP | 2 492 568 | 8/2012 |
| FR | 669587 | 11/1929 |
| JP | 11-294660 | 10/1999 |
| WO | WO 93/16311 | 8/1993 |
| WO | WO 03/001102 | 1/2003 |
| WO | WO 2004/046603 | 6/2004 |

OTHER PUBLICATIONS

International Search Report dated Jan. 3, 2018 issued in PCT International Patent Application No. PCT/GB2017/053086, 3 pp.
English Language Translation of Chinese Office Action dated Jun. 23, 2020 issued in Chinese Patent Application No. 201780067244.3, 4 pp.
European Examination Report dated Mar. 4, 2021 issued in European Patent Application No. 17787564.8, 10 pp.

* cited by examiner

SEAL ASSEMBLY

This application is the U.S. national phase of International Application No. PCT/GB2017/053086 filed Oct. 12, 2017 which designated the U.S. and claims priority to Great Britain Patent Application No. 1617305.6 filed Oct. 12, 2016, the entire contents of each of which are hereby incorporated by reference.

FIELD OF THE INVENTION

The present invention relates to a seal assembly, more particularly, but not exclusively, to a seal assembly configured for a seal to be created between an adjustable connector and two pipes.

BACKGROUND OF THE INVENTION

There is an ongoing requirement within the oil industry to provide cost-efficient and consistent methods of connecting oil pipes together in a way that minimises the risk of oil leakage.

Typically, flanged joints are used. These have a number of disadvantages. For example, flanged joints are vulnerable and can be compromised by uneven bolt tightening. Moreover, rubber seals are generally used within these joints, and often fail due to thermal degradation, as well as being at significant risk of damage and subsequent failure from bad practice when joints are assembled on site.

Flanged joints also require welding. This is time consuming during assembly, increasing down time for pipe repairs as well as presenting a fire risk. Further, amidst recent proposals for better offshore pipeline regulation and more refined safety rules covering repairs, there is a requirement to employ qualified welders to perform any repairs, which is a considerable added expense. The installation of flange joints also requires very high precision, requiring highly skilled labour for assembly, further increasing the cost of installation, repair and maintenance.

The present invention seeks to overcome or at least mitigate/alleviate one or more problems associated with the prior art.

SUMMARY OF THE INVENTION

A first aspect of the invention provides a seal assembly for a pipe. The seal assembly comprises a connector body having a first section and a second section, movable relative to one another. The first section and the second section each have an open end configured for receiving the free end of a pipe. The open ends of the first and sections are each configured for sealing engagement with the free end of a respective pipe. The seal assembly is movable between a first condition, in which the second section assumes a retracted position relative to the first section, and a second condition in which the second section assumes an extended position relative to the first section. A seal member is provided for creating a seal between the first section and the second sections in said first and second conditions.

Such a configuration advantageously allows an operator to insert the seal assembly into a spacing of fixed width between the free ends of two pipes (i.e. the position of the pipes may not be adjusted), and then quickly and easily extend the assembly from the retracted condition into the extended condition.

In exemplary embodiments, the open end of each of said first and second sections of said connector body includes a seal surface, for creating a seal between a respective pipe and the respective seal surface of connector body. In exemplary embodiments, one or both of said seal surfaces of the connector body defines a metal seal surface. As such, the free ends of the pipes can then be secured within the connector such that a reliable metal-to-metal seal is created between each pipe and the connector body, and also between each section of the connector body, thus ensuring that the risk of leakages occurring is minimised. Further, exemplary embodiments of the seal assembly are configured to allow these components to be locked together to limit axial movement, without the use of flanges or the components having to be welded together.

In exemplary embodiments, the seal member is configured to be located substantially between the first section and the second section.

In exemplary embodiments, the seal member is configured for providing a seal between an outer surface of the first section and an inner surface of the second section. Locating the seal member substantially between the first section and the second section advantageously allows for a reliable seal to be established between the first and second sections regardless of the position of the second section relative to the first section. More specifically, a reliable seal can be established whether the second section assumes the aforementioned second condition, the first condition or any other position therebetween. This means that the seal assembly has an advantageously flexible configuration, and can be used to establish a high quality, reliable seal between the free ends of two pipes having a variety of separations therebetween.

In exemplary embodiments, the seal member is configured for providing a metal-to-metal seal between the first section and the second section.

In exemplary embodiments, the seal member is a metallic element specifically dimensioned to fit around an outer surface of the first section, and wherein the metallic element is configured to be driven into engagement with the second section, such that a metal-to-metal seal is created between the second section and the metallic element, and between the metallic element an outer surface of the first section.

A metal seal also has a high resistance to corrosion, increasing the life of the seal, especially when compared to traditional seals, such as rubber or asbestos O-rings or gaskets.

In exemplary embodiments, the metallic element comprises a wedge having a tapered portion, and wherein said tapered portion comprising an angled surface, arranged to contact a corresponding angled surface of the second section.

In exemplary embodiments, the two angled surfaces have different angles.

In exemplary embodiments, the angled surface of the first section is provided on an inner surface of a recess, wherein said recess is configured to receive the wedge of the metallic element when the metallic element is driven into engagement with the second section.

In exemplary embodiments, the assembly includes a mechanical seal arrangement comprising a fastening arrangement for applying a force to the metallic element, in order to drive the metallic element into sealing engagement with the second section.

In exemplary embodiments, the fastening arrangement comprises the metallic element having a plurality of fasteners, and the second section having a plurality of fastening points, and wherein the fastening arrangement is configured to releasably attach the metallic element to the second section.

By providing the metallic element with a plurality of fasteners, and the second section with a plurality of fastening points configured to receive said fasteners, the metallic element can be advantageously quickly and easily attached to the second section such that a metal-to-metal seal is created between the metallic element and the first and second sections. In addition, the metallic element can be quickly and easily detached from the second section by virtue of said attachment being releasable, should an operator wish to remove the seal assembly.

In exemplary embodiments, the fastening points comprise a plurality of recesses, configured to align with the fasteners and to releasably attach to said fasteners during movement of the metallic element in a direction towards the second section.

In exemplary embodiments, the fasteners are bolts, and wherein the fastening points are threaded holes having a corresponding thread to that of each bolt.

Advantageously, a low-complexity arrangement is provided for attaching the metallic element to the second section. Such low-complexity ensures that the seal assembly can be quickly and easily attached, and secured by an operator in a potentially time-critical situation, without the requirement for complex tooling. Further, the costs associated with manufacturing the fastening arrangement, and as such the seal assembly as a whole, can be reduced.

In exemplary embodiments, the fasteners are arranged at regular intervals around a circumference of the metallic element; wherein the fastening points are located at regular intervals around an end face of the second section; and wherein the position of each fastener is complementary to the position of each fastening point.

Advantageously, distributing the fasteners at regular intervals around the circumference of the metallic element ensures that should an external force, such as a bending moment, act on a pipe inserted into the connector body, the load is more evenly distributed around the interface between the metallic element and the second section. The even distribution of said force therefore greatly reduces the likelihood that the metallic element may become detached from the second section, or that concentricity of the metallic element, the first section and the second section relative to one another will be detrimentally affected. Such a configuration therefore greatly reduces any negative impact of such an external force on the integrity of the metal-to-metal seal between the metallic element and the first and second sections.

In exemplary embodiments, the first section and the second section each comprise an adaptor for securing around the free end of a respective pipe, and each comprise a mechanical interlock arrangement, configured for driving the respective adaptor in the direction of the connector body to create a metal-to-metal seal between each pipe and the connector body.

In exemplary embodiments, the mechanical interlock arrangement is configured for preventing or limiting axial movement of the connector body relative to the free end of a respective pipe.

The metal-to-metal seal is established through the straightforward movement of each adaptor towards the connector body. As a result, the assembly can advantageously be quickly and easily connected to each pipe, to rapidly establish a reliable seal therebetween without the need for supplementary components, further demanding processing steps such as welding or complex tooling.

In exemplary embodiments, the connector body comprises a bore, and wherein the metal-to-metal seal created between each pipe and the connector body is created between an outer surface of the free end of each pipe and a side wall of said bore.

The seal assembly is configured such that a metal-to-metal seal is created between a specifically defined point on the outer surface of the free end of each pipe, and the side wall of the connector body bore. As a result, each seal is self-creating upon the free end of each pipe being inserted into the free end of the connector body, meaning that advantageously, a reliable and high-quality seal is quickly achievable.

In addition, the bore of the connector body provides a fluid flow path from each pipe into the connector body, wherein the seal is created close to said fluid flow path. Locating each seal close to the fluid flow path advantageously ensures that the fluid is transmitted between each pipe and the connector body with minimal leakage through the components of the assembly.

In exemplary embodiments, the diameter of the bore decreases away from each open end of the connector body, such that the metal-to-metal seal is created as the free end of each pipe is driven into the connector body.

Providing a bore of progressively decreasing diameter advantageously ensures that a metal-to-metal seal is created as the free end of each pipe is inserted within each open end of the connector body, and then simply moved in the direction of the connector body.

In exemplary embodiments, the bore has a central longitudinal axis and is defined by a circumferential side wall, and wherein a portion of the side wall extends away from each open end of the connector body at an angle of less than 10° with respect to the central longitudinal axis.

In exemplary embodiments, each portion of the side wall extends at an angle of substantially 4° with respect to the central longitudinal axis.

It has been found that tapering a portion of the side wall of the bore of the connector body at an angle of less than 10° with respect to the central longitudinal axis, advantageously allows a metal-to-metal seal to be created between the free end of a pipe and the side wall of the bore of the connector, as the free end of the pipe is inserted within the free end of the connector body, without unduly limiting the volume of the bore available for the transmission of a fluid through the connector body.

In exemplary embodiments, the adaptor comprises a first ring, configured to be mounted around the circumference of the free end of each pipe, and a second ring configured to cooperate with each first ring in order to drive each first ring into engagement with an outer surface of a respective pipe.

In exemplary embodiments, each first ring has an angled outer surface defining a first taper, and each second ring has an angled inner surface defining a second taper complimentary to said first taper, wherein contact forces acting therebetween increase upon axial movement of each second ring relative to each first ring in the direction towards the connector body, for driving each first ring in a radial direction into contact with the outer surface of a respective pipe.

Advantageously, the first ring and the second ring of each adaptor are configured such that straightforward relative movement therebetween, as a result of the second ring being moved in the direction of the connector body by the mechanical interlock arrangement, is sufficient to secure each first ring with respect to the outer surface of a respective pipe, and to create a metal-to-metal seal between the connector body and the free end of each pipe. As a result, such a configuration may provide an operator with savings in both time and money when setting up, and dismantling the sealing assembly.

In exemplary embodiments, each first ring has a first end, a second end and a central longitudinal axis, and wherein each angled outer surface extends between the first and second ends at an angle of between 5 and 15° with respect to the central longitudinal axis.

In exemplary embodiments, each angled outer surface extends at an angle of substantially 8° to the central longitudinal axis.

It has been found that tapering the angled outer surface of each first ring at an angle of between 5° and 15° with respect to the central longitudinal axis, advantageously allows a minimum level of relative movement between the said rings and each second ring to result in a maximum increase in contact stresses acting therebetween.

Advantageously, this means an operator only has to move each second ring a small distance, in order to achieve ensure that the first ring is securely attached to the outer surface of a pipe.

In exemplary embodiments, each first ring comprises a first radial stop surface, arranged for engagement by each respective second ring, to limit movement of each second ring in a direction towards the connector body.

The provision of such a radial stop limits the extent to which each second ring may be moved relative to each first ring, in the direction towards the connector body. Advantageously, this ensures that each second ring is prevented from overriding the respective first ring when the seal assembly is connected to the free end of each pipe, thus reducing the likelihood of damage to the assembly and the metal-to-metal seal being compromised.

In exemplary embodiments, each of the first and second sections includes a first recess, and wherein a first end of each first ring is configured to nest within each recess when each second ring is driven in the direction of the connector body.

The dimensions of the first end of each first ring and each recess are configured such that the first end of each first ring may nest within a respective recess. This ensures that the concentricity of each first ring, each second ring, the connector body and each inserted pipe is maintained. Advantageously, this ensures that a reliable seal is maintained between the connector body and each inserted pipe even when the pipe may be subject to externally acting forces, such as a bending moment.

In exemplary embodiments, the first end of each first ring comprises a tapered outer surface configured to cooperate with a side wall of each first recess, to assist the passage of the first end of each first ring into each first recess.

In exemplary embodiments, each first recess is configured to be arranged adjacent the outer surface of a respective pipe, when each pipe is inserted into a respective open end of the connector body.

In exemplary embodiments, each of the first and second sections has a substantially cylindrical form defined by a circumferential side wall, wherein said side wall has an end face having a stepped profile which defines the respective first recess, and wherein an innermost wall of each first recess is adjacent the bore of the connector body.

It has been found that the point at which each first ring engages with the connector body, when the mechanical interlock arrangement is secured, may act as a pivot point when externally acting forces, such as bending moments, act on a connected pipe. It has also been found that minimising the radial distance of this point from the pipe can greatly reduce the impact of said external forces on the integrity of the metal-to-metal seal between the free end of the pipe and the connector body. As a result, the likelihood of fluid leakage is greatly reduced.

In exemplary embodiments, each first recess comprises an opening, and wherein the width of each opening is less than 50% of the radial width of the circumferential side wall.

In exemplary embodiments, the width of each opening is substantially 30% of the radial width of the circumferential side wall.

The dimensions of each recess are configured such that the point at which an attached pipe may pivot with respect to the connector body, should external forces such as bending moments act on said pipe, is located as closely to the pipe as possible. Advantageously, this greatly reduces the likelihood that the metal-to-metal seal between the connector body and the attached pipe will be compromised as a result of said forces, and that fluid leakage may result. In addition, such dimensions allow for the radial width of the connector body to be maximised, i.e. formation of the recess does not require the removal of material to an extent that may compromise the structural or mechanical integrity of the connector body.

In exemplary embodiments, the innermost wall of each first recess defines a radial stop surface arranged to engage a second radial stop surface provided on the first end of the first ring, and wherein abutment of said radial stop surfaces prevents further movement of each adaptor in the direction towards the connector body.

The provision of such a radial stop limits the extent to which each first ring may move towards the connector body, and as such advantageously provides for continued movement of each second ring towards the connector body when the stop surfaces are in abutment to serve to increase the security of engagement between each first ring and the respective pipe.

In exemplary embodiments, an inner surface of each first ring is non-planar, and is configured to securely engage with the outer surface of a respective pipe.

The inner surface of each first ring is configured such that upon engagement with the outer surface of a respective pipe, and upon movement of each second ring with respect to each first ring in the direction towards the connector body, each first ring may securely grip the outer surface of the respective pipe. As a result, the likelihood of undesired relative movement between each first ring and the respective pipe is advantageously reduced, and the free end of each pipe may be more reliably driven into the respective open end of the connector body upon further movement of each second ring with respect to each first ring, to create a metal-to-metal seal between the free end of the respective pipe and the connector body.

In exemplary embodiments, the non-planar profile of the inner surface of each first ring is configured to engage the outer surface of a respective pipe by virtue of an interference fit.

Configuring the inner surface of each first ring such that engagement with the outer surface of a respective pipe is by virtue of an interference fit, provides an advantageously low-complexity arrangement wherein no further supplementary components are required to ensure a secure engagement between each first ring and a respective pipe.

In exemplary embodiments, each first ring includes a keying surface configured for purchase into the outer surface of a respective pipe.

Advantageously, such an arrangement means that no modification of the outer surface of each pipe is required to ensure that the first ring may securely engage with the outer surface.

In exemplary embodiments, the inner surface of each first ring comprises a profile configured to complement a non-planar profile of the outer surface of a respective pipe.

In exemplary embodiments, the inner surface of each first ring comprises a plurality of projections (e.g. teeth or barbs), configured to be received in a series of recesses on the outer surface of a respective pipe.

By providing the inner surface of each first ring with a profile, such as a series of projections, that complements the profile of the outer surface of a respective pipe (i.e. a series of recesses), each first ring may engage more securely with the outer surface of said respective pipe.

Advantageously, this provides for each pipe being driven more reliably into the respective open end of the connector body, which in turn provides for a reliable, high quality metal-to-metal seal being created between each pipe and connector body.

In exemplary embodiments, each adaptor further comprises a locating arrangement for ensuring the alignment of the respective adaptor with the connector body, as each second ring is moved in the direction towards the connector body.

The provision of each locating arrangement further ensures that the concentricity of each first ring, each second ring, the connector body and each inserted pipe is maintained. Advantageously, this ensures that a reliable seal is maintained between the connector body and each inserted pipe even when each pipe may be subject to externally acting forces, such as a bending moment.

In exemplary embodiments, each locating arrangement comprises an end face of each of the first and second sections having a recess, and an end face of the first end of each second ring having a projection configured to be received within said recess during movement of each second ring in the direction towards the connector body.

Such an arrangement requires no additional, supplementary components to maintain the position of the adaptor with respect to the connector body. The apparatus is therefore of advantageously low-complexity, meaning that the process of manufacturing the seal assembly can be simplified, and the likelihood that components of the assembly will be dropped and potentially lost during attachment and detachment of the assembly is also reduced.

In exemplary embodiments, the locating arrangement comprises the end face of each of the first and second sections having a plurality of recesses, and the end face of the first end of each second ring having a plurality of projections configured to be received within said recesses.

The provision of a plurality of recesses and a plurality of projections ensures that the concentricity of each first ring, each second ring, the connector body and each inserted pipe is maintained as accurately as possible. Advantageously, this further ensures that a reliable metal-to-metal seal is maintained between the connector body and each inserted pipe even when the pipe may be subject to externally acting forces, such as a bending moment.

In exemplary embodiments, the projections comprise a series of castellations, wherein aid castellations project at regular intervals around the circumference of the end face of the first end of each second ring, and wherein said castellations are preferably arcuate.

Advantageously, distributing the projections at regular intervals around the circumference of the end face of each second ring ensures that should an external force, such as a bending moment, act on a pipe inserted into the connector body, the load is more evenly distributed around the interface between each second ring and the connector body. The even distribution of said force therefore greatly reduces the likelihood that the concentricity of each first ring, each second ring, the connector body and each inserted pipe relative to one another will be lost, and as such, greatly reduces any negative impact on the integrity of the metal-to-metal seal between the connector body and the free end of a connected pipe.

In addition, it has been found that by providing said castellations, such a configuration further distributes said externally acting force more evenly across each projection. Advantageously, the likelihood that any one projection may fail and break away from the second ring under the action of such a force, is greatly reduced.

In exemplary embodiments, each mechanical interlock arrangement further comprises a fastening arrangement for pulling the connector body in the direction of each adaptor, in order to drive the free end of each pipe into the respective open end of the connector body to create the metal-to-metal seal therebetween.

The provision of a fastening arrangement means that each adaptor can be secured in place with respect to the connector body, when each second ring is moved fully in the direction of the connector body. Therefore, advantageously, the metal-to-metal seal between the free end of each pipe and the connector body can be easily and reliably maintained once created, with relative movement between each connected pipe and the connector body minimised.

In exemplary embodiments, each fastening arrangement comprises each second ring having a plurality of fasteners, and the connector body having a plurality of fastening points, and wherein each fastening arrangement is configured to releasably attach the respective second ring to the connector body.

By providing each second ring with a plurality of fasteners, and the connector body with a plurality of fastening points configured to receive said fasteners, each second ring can be advantageously quickly and easily attached to the connector body upon each adaptor having been moved fully in the direction of the connector body, such that a metal-to-metal seal exists between the connector body and the free end of each inserted pipe. In addition, each second ring can be quickly and easily detached from the connector body by virtue of said attachment being releasable, should an operator wish to remove the seal assembly.

In exemplary embodiments, each second ring has a plurality of apertures extending therethrough, and wherein the fasteners are configured to be inserted through said apertures in the direction towards the connector body.

In exemplary embodiments, the fastening points comprise a plurality of recesses, configured to align with the fasteners and to releasably attach to said fasteners during movement of each second ring in the direction towards the connector body.

In exemplary embodiments, the fasteners are bolts, and wherein the fastening points are threaded holes having a corresponding thread to that of each bolt.

Advantageously, a low-complexity arrangement is provided for attaching each second ring to the connector body. Such low-complexity ensures that the seal assembly can be quickly and easily attached, and secured by an operator in a potentially time-critical situation, without the requirement for complex tooling. Further, the costs associated with manufacturing the fastening arrangement, and as such the seal assembly as a whole, can be reduced.

In exemplary embodiments, the fasteners are arranged at regular intervals around the circumference of each second ring, and wherein the fastening points are located at regular intervals around the end face of each of the first and second sections, and wherein the position of each fastener is complementary to the position of each fastening point.

Advantageously, distributing the fasteners at regular intervals around the circumference of the end face of each second ring ensures that should an external force, such as a bending moment, act on a pipe inserted into the connector body, the load is more evenly distributed around the interface between each second ring and the connector body. The even distribution of said force therefore greatly reduces the likelihood that each second ring may become detached from the connector body, or that concentricity of each first ring, each second ring, the connector body and each inserted pipe relative to one another will be detrimentally affected. Such a configuration therefore greatly reduces any negative impact of such an external force on the integrity of the metal-to-metal seal between the connector body and the free end of each pipe.

In exemplary embodiments, the position of each fastener alternates with the position of each castellation around the circumference of each second ring.

Advantageously, distributing the fasteners and projections at regular, alternating intervals around the circumference of the end face of each second ring maximises the stability of the interface between each second ring and the connector body, and optimises the distribution of load should an external force, such as a bending moment, act on a pipe inserted into the connector body.

In exemplary embodiments, each of the first and second sections has a cap for further securing the position of the adaptor of each of the first and second sections with respect to the connector body.

Advantageously, the first and second caps protect the adaptors from damage, such as abrasion that might otherwise occur if the force applying components contacted the components directly.

In addition, the connector body can be housed generally within the first and second caps. This greatly decreases the risk of catastrophic failure of the apparatus (e.g. a large blow out). If a component fails, there will simply be leakage of the fluid within the assembly, e.g. along a tortuous path. In most cases, it is believed that this could be easily detected, so that the problem can be attended to as soon as possible.

In exemplary embodiments, each cap has a cylindrical form, and comprises a bore configured to receive a respective section of the connector body and configured to be secured with respect to an outer surface of the connector body.

In exemplary embodiments, the bore is accessed through an opening provided at a second end of each cap, wherein a first end of each cap comprises an aperture configured to receive the free end of a pipe, and wherein the free end of a pipe may be inserted through each aperture and into the connector body.

In exemplary embodiments, each cap further comprises an abutment surface configured to abut the adaptor of the respective first or second section, for securing position of the respective adaptor with respect to the connector body.

Such a configuration means that when each cap is secured with respect to the outer surface of the second section, and when the abutment surface of each cap abuts the adaptor of the respective first or second section, each cap acts to restrict movement of each adaptor away from the connector body, and as such, acts to reinforce the security of engagement provided by the fastening arrangement. In exemplary embodiments, the bore of each cap is defined by an inner circumferential surface, and wherein said surface has a screw thread corresponding to a complementary screw thread provided on the outer surface of the connector body, and wherein a portion of the connector body is received within the bore of each cap as a result of relative rotational motion therebetween.

In exemplary embodiments, each abutment surface is configured to abut the second ring of the respective adaptor.

In exemplary embodiments, further relative rotational motion between each cap and the connector body brings the second ring of each adaptor into abutment with the respective abutment surface, such that the position of the respective adaptor is secured with respect to the connector body.

A second aspect of the invention provides a method of connecting two pipes in fluid communication, the method comprising: providing two pipes, each pipe having a free end, inserting the free end of the first pipe through an aperture provided at a first end of a first cap, and inserting the free end of the second pipe through an aperture provided at the first end of a second cap, preparing the outer surface of each pipe such that a first ring of an adaptor may be secured thereon, locating an adaptor on the free end of each pipe such that a first ring of each adaptor is securely engaged with the prepared outer surface of each pipe, locating the free end of a first pipe within an opening of a first section of a connector body, telescopically extending a second section of the connector body with respect to the first section of the connector body, and locating the free end of a second pipe within an opening of the second section of the connector body, driving the free ends of said pipes into sealing engagement with the first and second sections respectively, by moving a second ring of each adaptor in the direction of the connector body, providing each pipe with a mechanical interlock arrangement comprising a fastening arrangement, and securing the free end of each pipe with respect to the connector body to prevent or limit axial movement of each pipe with respect to the connector body by fastening each of said fastening arrangements, providing a seal member for creating a metal-to-metal seal between the first section and the second section, and providing said seal member with a fastening arrangement, securing the position of the first section of the connector body with respect to the second section connector body to both create a metal-to-metal seal therebetween and to prevent or limit further axial movement therebetween, securing the first and second caps such that the second section of the connector body is substantially enveloped, and the first and second mechanical interlock arrangements are further secured with respect to the connector body.

BRIEF DESCRIPTION OF THE DRAWINGS

Embodiments of the invention will now be described with reference to the accompanying drawings, in which.

DETAILED DESCRIPTION OF EMBODIMENT(S)

Referring to FIGS. 1 to 5, a seal assembly for a pipe is indicated generally at 100. The seal assembly 100 includes a connector body 102 having a substantially cylindrical form, and first and second ends 108, 110 each of which has an opening 112 configured to receive the free end 114 of a pipe 106. The seal assembly has substantially identical first and second adaptors 115 and mechanical interlock arrangements 104, wherein the mechanical interlock arrangements 104 are configured for cooperation between the adaptor 115 and the connector body 102, such that the adaptor 115 may be driven in the direction of the connector body 102 to create a metal-to-metal seal between a pipe 106 and the connector body 102. The connector body 102 includes a first section (inner joining stock) 172 and a second section (outer joining stock) 174.

The seal assembly 102 is movable between a first condition, in which the second section 174 assumes a retracted position relative to the first section 172, and a second condition in which the second section 174 assumes an extended position relative to the first section 172, and wherein a seal member is provided for creating a seal between the first section 172 and the second sections 174 in said first and second conditions.

This configuration allows an operator to insert the seal assembly 100 into a spacing of fixed width between the free ends 114 of two pipes 106 (i.e. the position of the pipes may not be adjusted), and then extend the assembly 100 from the first position into the second position such that the free ends 114 of the pipes 106 may be received and secured into opposing open ends 112 of the connector body 102.

In the described embodiment, each mechanical interlock arrangement 104 is movable between an unsecured condition (illustrated in FIG. 4), in which a pipe 106 has been inserted into each of the first and second ends 108, 110 of the connector body 102 but may still be easily removed, and a secured condition (illustrated in FIG. 5), in which the position of the pipes 106 is securely fixed with respect to the connector body 102, and cannot be removed without the mechanical interlock arrangement 104 being moved back into the unsecured condition. The seal assembly of the described embodiment further includes a mechanical seal arrangement 175 having a seal member (described further below), arranged substantially between the first section 172 and the second section 174 to allow a metal-to-metal seal to be created therebetween, and first and second caps 176, 178 configured to be securable with respect to the second section 174 (also described further below). The mechanical seal arrangement 175 is movable between a unsecured condition, in which the first and second sections 172, 174 may slidably move relative to one another, and a secured condition, in which the position of the first and second sections 172, 174 are securely fixed with respect to one another. The first and second caps 176, 178 are also movable between an unsecured condition in which each cap 176, 178 may move freely with respect to the connector body 102, and a secured condition, in which the position of each cap is securely fixed with respect to the second section 174 of the connector body 102. When the mechanical interlock arrangements 104 and the mechanical seal arrangement 175 are each in the secured condition, and each of the first and second caps 176, 178 is also in the secured condition, the seal assembly 100 overall can be said to be in a full secured condition.

The adaptors 115 and mechanical interlock arrangements 104 at each of the first and second ends 108, 110 of the connector body 102 are substantially identical, and allow a metal-to-metal seal to be achieved between the connector body 102 and the free ends 114 of each pipe 106. For reasons of conciseness, the seal assembly 100 will now be described further with reference to a single adaptor 115 and mechanical interlock arrangement 104, which may be located at either the first 108 or second 110 end of the connector body 102.

Figure 4:
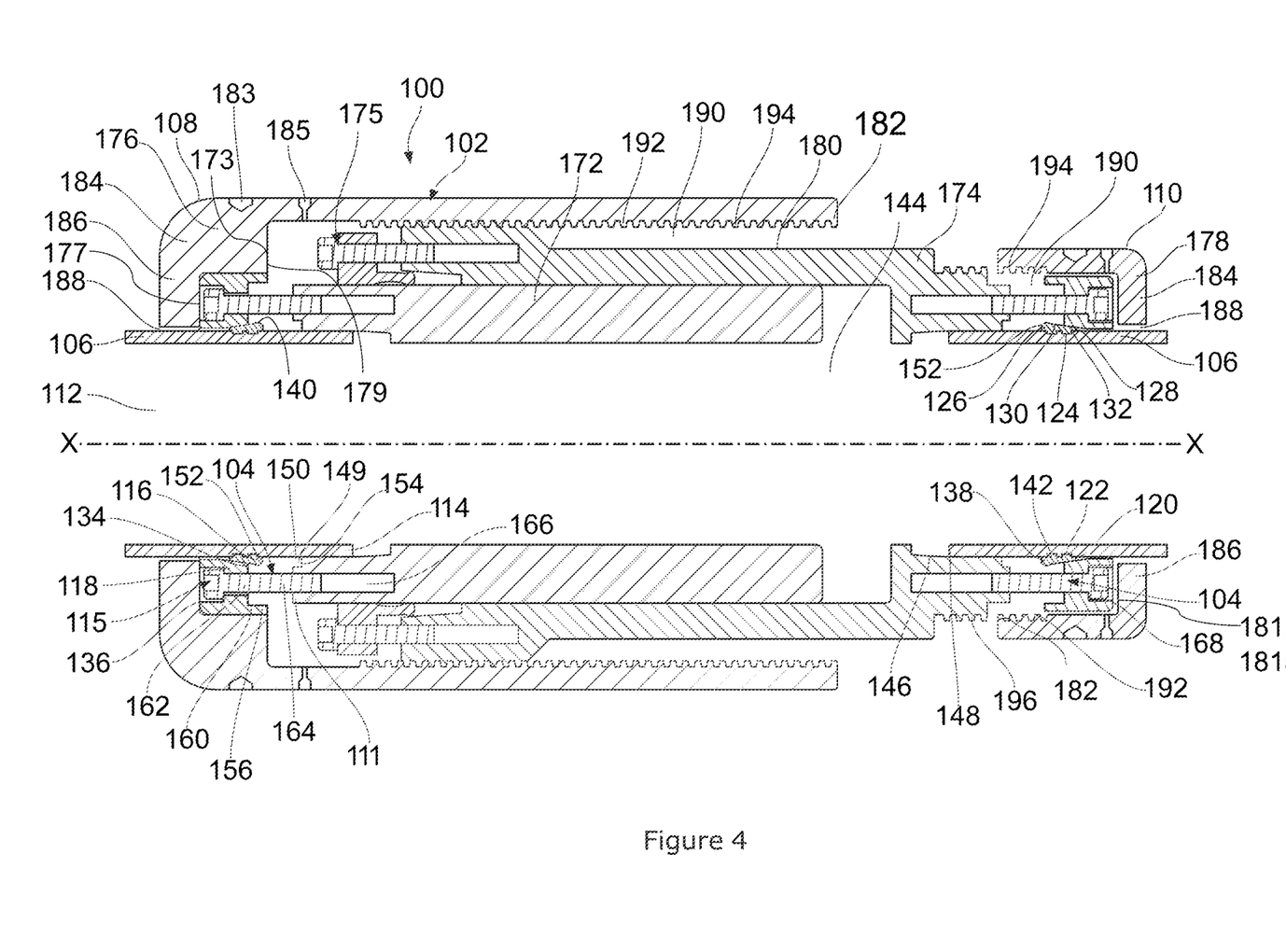
FIG. 4 is a cross sectional view of the seal assembly of FIG. 1, wherein the seal assembly is shown in an unsecured condition.

Referring now to FIG. 4, in which the seal assembly 100 is shown in an unsecured condition, the adaptor 115 includes a first ring, 116, and a second ring 118. The first ring 116 is configured to be mounted around the circumference of the free end of a pipe 106, and defines an aperture with a diameter closely matched to the outer diameter of the desired pipe to be coupled. In the described embodiment, the first ring 116 is a split ring. The provision of a split ring ensures that the pipe 106 may be initially inserted into the aperture, but that once inserted, the first ring 116 will be engaged in close contact with the outer surface of the pipe 106.

An inner surface 120 of the first 116 ring is non-planar, and is configured to securely engage with the outer surface of a pipe 106. This configuration allows the first ring 116 to securely grip the outer surface of the pipe 106 and as a result, the likelihood of undesired relative movement between the first ring 116 and the pipe 106 is advantageously reduced. In the described embodiment, the non-planar profile of the inner surface 120 of the first ring 116 includes a series of circumferential ridges 122, configured to engage with corresponding channels 124 formed around the outer circumference of the outer surface of the pipe 106 by virtue of an interference fit. In alternative embodiments, the inner surface 120 of the first ring 116 and the outer surface of the pipe may have alternative, complementary profiles, or the inner surface 120 of the first ring 116 may include a keying surface configured for purchase into the outer surface of the pipe 106.

Referring again to FIG. 4, the first ring 116 has a first end 126 and a second end 128, with an angled outer surface 130 extending therebetween. The angled outer surface 130 is configured to slidably engage with an angled inner surface 132 that extends between a first end 134 and a second end 136 of the second ring 118. The first ring 116 and the second ring 118 share a central longitudinal axis, indicated by X-X in FIGS. 2 and 3. The angled outer surface 130 of the first ring 116, and the angled inner surface 132 of the second ring 118 each extend at an angle of substantially 8° with respect to the central longitudinal axis. When the second ring 118 is moved relative to the first ring 116 such that the angled inner surface 132 the second ring 118 slides over the angled outer surface 130 of the first ring 116, contact stresses arising therebetween increase greatly, which acts to drive the first ring 116 into engagement with the outer surface of the pipe 106.

Tapering the angled outer surface 130 of the first ring 116 and the angled inner surface 132 of the second ring 118 at an angle of substantially 8° with respect to the central longitudinal axis, advantageously allows a minimum level of relative movement between the first ring 116 and the second ring 118 to result in a maximum increase in contact stresses acting therebetween. Advantageously, this means an operator only has to move the second ring 118 a small distance in order to ensure that the first ring 116 is securely attached to the outer surface of the pipe 106. In alternative embodiments, the angled outer surface may extend at an angle of between 5° and 15° with respect to the central longitudinal axis.

The first end 126 of the first ring 116 has a collar 138, an outwardly facing surface 140 of which defines the maximum diameter of the first ring 116. The collar 138 has a first radial stop surface 142, arranged to substantially face the first end 134 of the second ring 118. The radial stop surface 142 is configured to abut the first end 134 of the second ring 118, and therefore limit the maximum extent to which the second ring 118 can be moved relative to the first ring 116 in a direction towards the connector body 102, and into the secured position.

The first ring 116 and the second ring 118 are therefore configured to cooperate when the second ring 118 is moved relative to the first ring 116 in the direction of the connector body 102, such that the first ring 116 is driven into engagement with the outer surface of the pipe 106, whilst at the same time, the radial stop surface 142 prevents the second ring 118 from overriding the first ring when the seal assembly 100 is connected to the free end 114 of a pipe 106, thus reducing the likelihood of damage to the seal assembly 100 and the metal-to-metal seal being compromised. In addition, this configuration prevents the second ring from overriding the first ring when the sealing assembly is attached to a first and a second pipes in fluid communication, and said first and second pipes are subject to external stresses such as bending moments, which helps to ensure the structural integrity of the connection and in turn maintain the integrity of the metal-to-metal seal.

The adaptor 115 is configured such that as the second ring 118 is moved towards the connector body 102, whilst the angled outer surface 130 of the first ring 116 is in contact with the angled inner surface 132 of the second ring 118, the free end of the pipe 106 is driven into the opening 112 of the connector body 102. This allows a metal-to-metal seal to be created between the pipe 106 and the connector body 102 through straightforward relative motion between components of the adaptor 115. As a result, the assembly can advantageously be quickly and easily connected between two pipes, to rapidly establish a reliable seal therebetween without the need for supplementary components, further demanding processing steps such as welding or complex tooling.

The connector body 102 comprises a bore 144 defined by a circumferential side wall 146, extending between the opening 112 at the first end 108 of the connector body 102 and the opening 112 at the second end 110 of the connector body 102. The bore 144 has a central longitudinal axis that is substantially coaxial with the central longitudinal axes of the first ring 116 and the second ring 118, and is also indicated by X-X in FIGS. 2 and 3. The diameter of the bore 144 decreases as the side wall 146 extends between the opening 112 and a mid-point of the connector body 102 (i.e. the diameter of the bore 144 has a maximum value at each opening 112, and a minimum value at the mid-point of the connector body 102). This configuration means that when the pipe 106 is driven into the connector body by as a result of the second ring 118 being moved in the direction of the connector body 102 whilst in contact with the first ring 116, the free end 114 of the pipe 106 is driven into contact with the side wall 146 of the bore 144. More specifically, the outer surface 148 of the free end 114 of the pipe 106 is driven into contact with the side wall 146 of the bore 144. This results in local deformation of the surface 148 of the pipe 106, which in turn forms a metal-to-metal seal between the outer surface 148 of the free end 114 of the pipe 106 and the side wall 146 of the bore 144. The metal-to-metal seal is therefore self-creating upon the free end 114 of the pipe 106 being inserted into the free end of the connector body 102, meaning that advantageously, a reliable and high-quality seal is quickly achievable.

Figure 5:
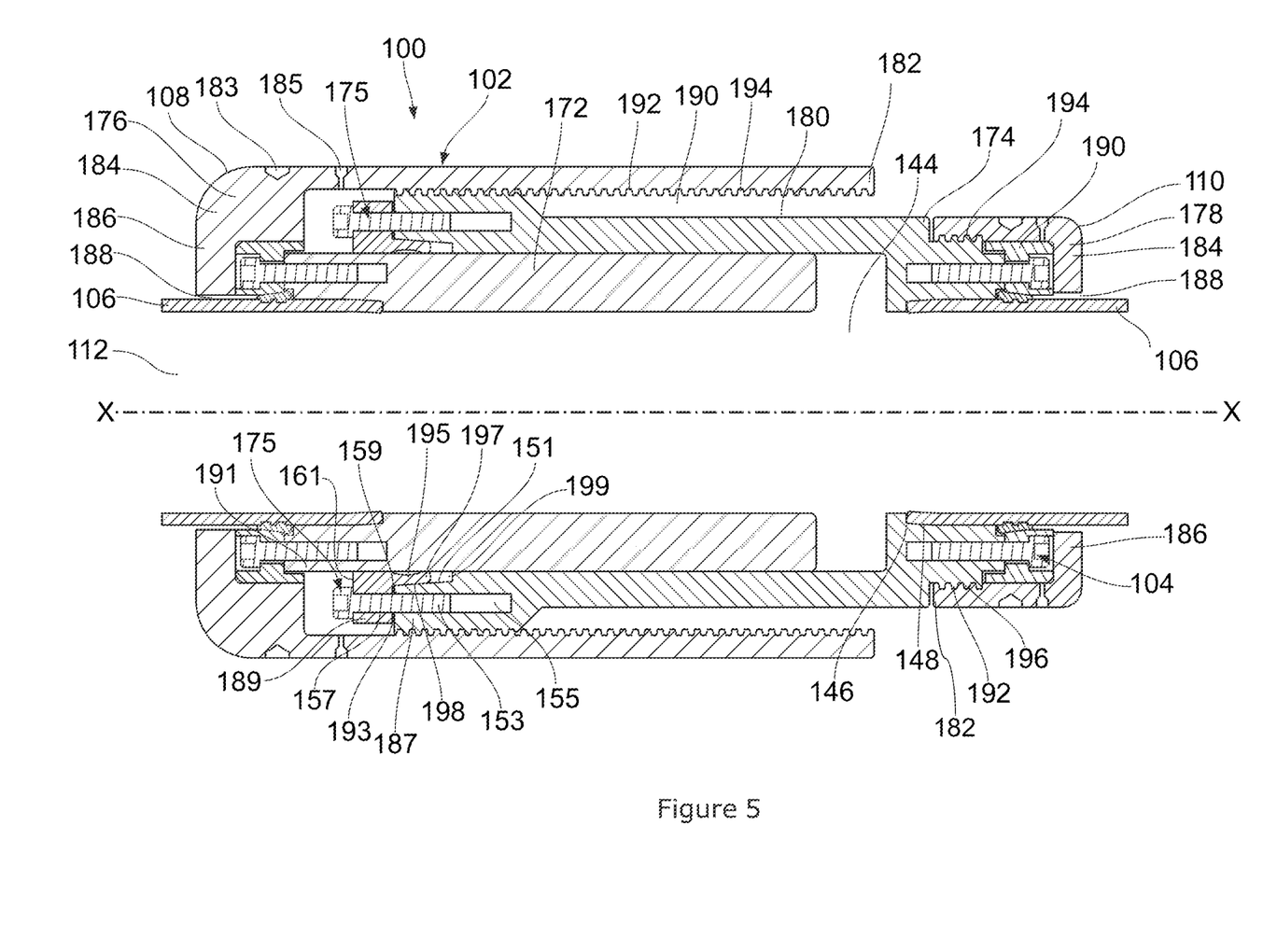
FIG. 5 is a cross sectional view of the seal assembly of FIG. 1, wherein the seal assembly is shown in a secured condition.

Referring to both FIGS. 4 and 5, in the described embodiment, the minimum diameter of the bore 144 is larger than the diameter of the lumen of each inserted pipe 106. This configuration ensures that there is minimal restriction on the passage of a fluid through the connector body 102. In alternative embodiments, the minimum diameter of the bore 144 may be substantially equal to the diameter of the lumen of each inserted pipe 106. In yet further alternative embodiments, the minimum diameter of the bore 144 may be smaller than the diameter of the lumen of each inserted pipe 106.

The metal-to-metal seal is created close to the flow path of fluid through the connector body 102, between the free ends 114 of each pipe 106. Locating the metal-to-metal seal close to said fluid flow path advantageously ensures that the fluid is transmitted from one pipe to another with penetration into the components of the seal assembly 100.

In the described embodiment, a portion of the side wall 146 extends away from the opening 112 *t* of the connector body 102, at an angle of substantially 4° with respect to the central longitudinal axis. In the described embodiment, the tapered portion of the side wall extends between the opening 112 of the connector body 102 and point substantially at a mid-point of the connector body 102. In alternate embodiments, the tapered portion of the side wall may extend a greater or lesser distance into the connector body 102, in a direction away from the opening 112. Such a configuration has been found to advantageously allow a metal-to-metal seal to be created between the free end 114 of a pipe 106 and the side wall 146 of the bore 144 of the connector body 102, without unduly limiting the volume of the bore 144 available for the transmission of a fluid through the connector body 102. In alternative embodiments, the side wall 146 may taper at any other angle of less than 10° with respect to the central longitudinal axis. In further alternative embodiment, the side wall 146 may taper at an angle of greater than 10° with respect to the central longitudinal axis.

The first and second ends 108, 110 of the connector body 102 each have a radially extending end face 111. Each of said end faces 111 has a first recess 150, configured to receive the collar 138 at the first end 126 of the first ring 116, when the second ring 118 is moved, in contact with the first ring 116, in the direction towards the connector body 102. As the first ring 116 is moved towards the connector body 102, the first end 126 of the first ring 116 is received within the first recess 150 until a second radial stop surface 152, provided at the first end 126 of the first ring 116, abuts a third radial stop surface 154 which defines a base wall of the recess 150.

The first end 126 of the first ring 116 is configured to nest within the first recess 150 when the second radial stop surface 152 is in abutment with the third radial stop surface 154.

In the described embodiment, the recess 150 has an opening 149, the radial width of which is substantially 30% of the radial width of the connector body 102. In alternative embodiments, the opening 149 may have a width of another dimension less than 50% of the radial width of the connector body.

Providing the first recess 150 with said dimensions allows for the radial width of the connector body 102 to be maximised as far as possible. This means that in forming the recess, material is not removed from the connector body 102 to an extent that may compromise the structural or mechanical integrity of the connector body 102.

In the described embodiment, the first recess 150 extends continuously around the circumference of an end face 111 at each of the first and second ends 108, 110 of the connector body 102. In alternative embodiments, the first recess 150 may comprise a plurality of individual recesses, arranged evenly or unevenly around the circumference of the end face 111 at each of the first and second ends 108, 110 of the connector body 102.

Figure 1:
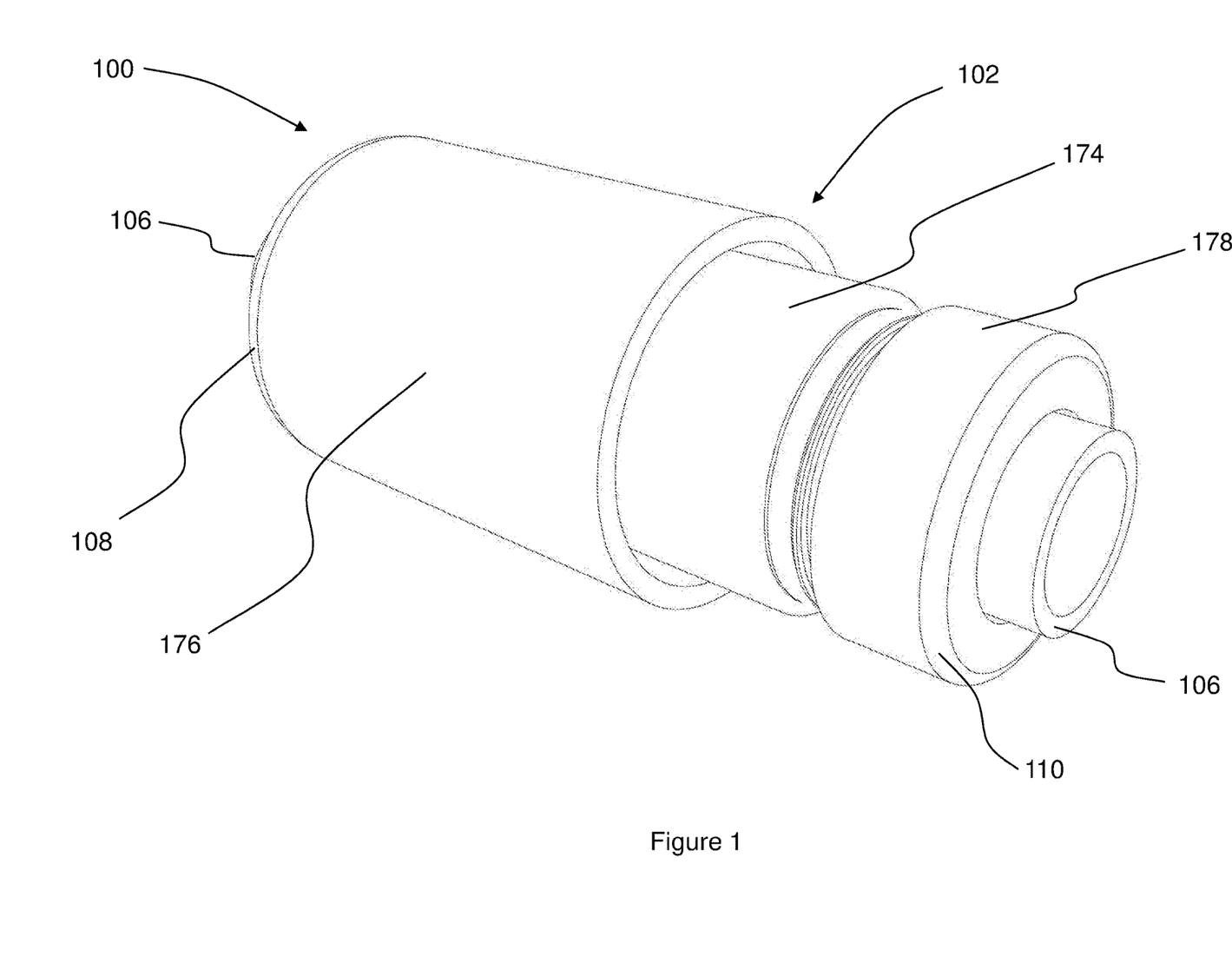
FIG. 1 is a perspective view of a seal assembly according to an embodiment of the invention.
Figure 2:
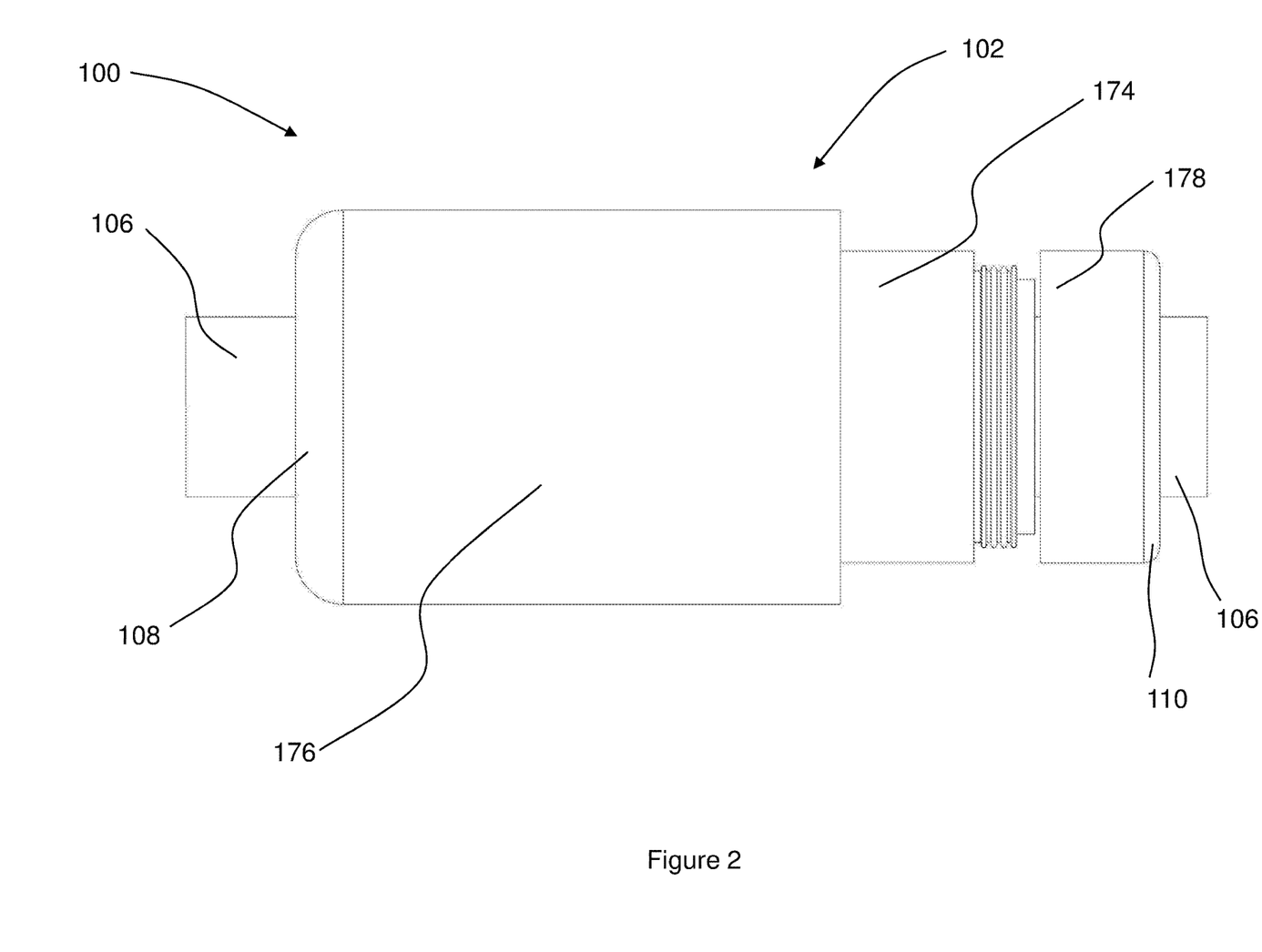
FIG. 2 is a side view of the seal assembly of FIG. 1.
Figure 3A:
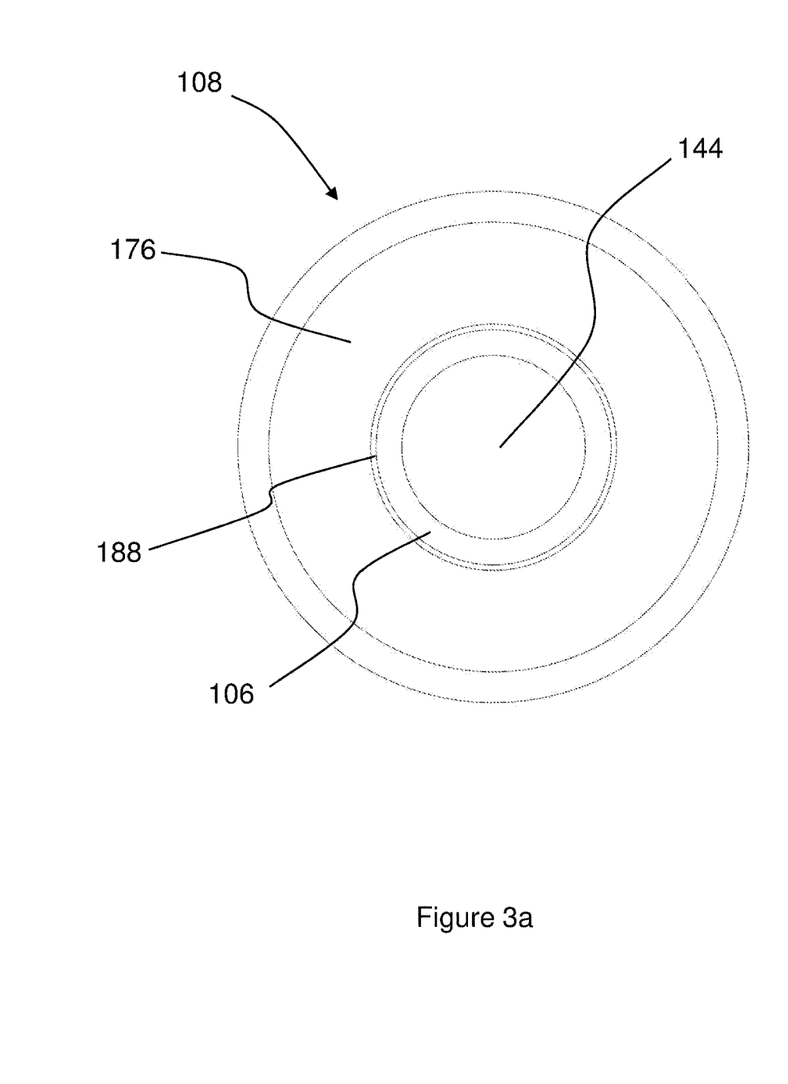
FIG. 3a is an end view of a first end of the seal assembly of FIG. 1.
Figure 3B:
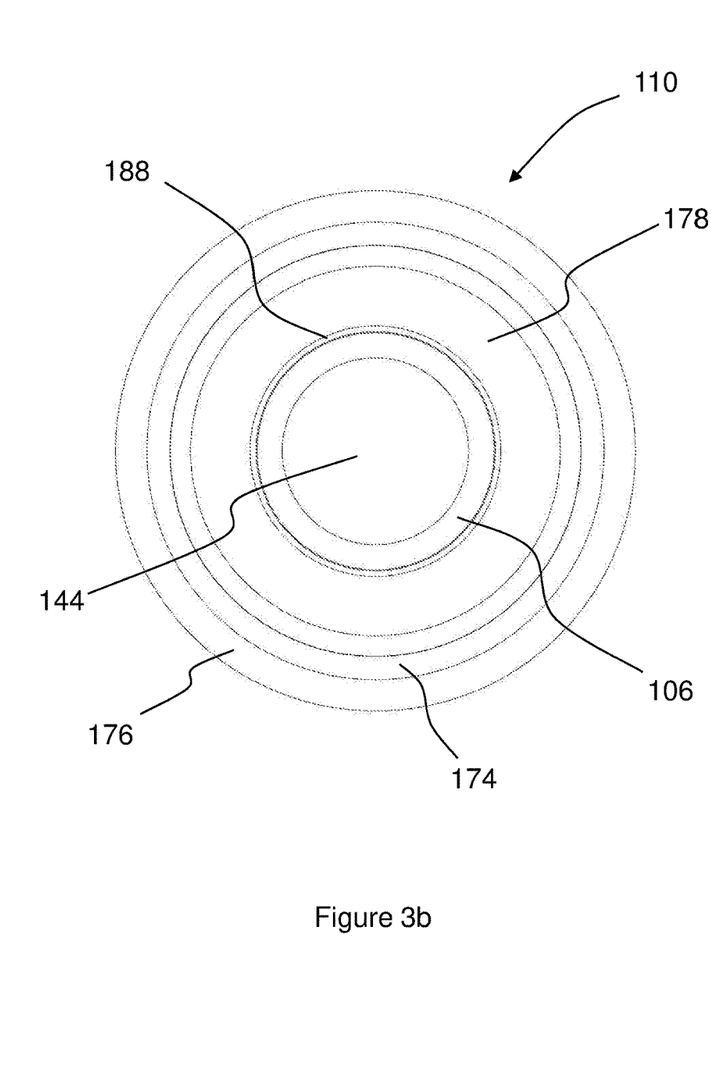
FIG. 3b is an end view of a second end of the seal assembly of FIG. 1.

As illustrated in FIGS. 2 and 3, the connector body 102 is configured such that the first recess 150 is located adjacent the outer surface of the pipe 106 when said pipe 106 is inserted into the open end 112 of the connector body 102. As shown in FIG. 3, when the mechanical interlock arrangement 104 is in the secured condition this allows the interconnection between the first end 126 of the first ring 116 and the first recess 150 to be located adjacent the outer surface of the pipe 106. Such a configuration ensures that the concentricity of the first ring 116, the second ring 118, the connector body 102 and each inserted pipe 106 is maintained. This is particularly important for maintaining the integrity of the metal-to-metal seal once the seal assembly is operational and conveying fluid between two pipes.

When the mechanical interlock arrangement 104 is secured with respect to the connector body 102 (i.e. in the secured condition), the interconnection between the first ring 116 of the adaptor 115 and the connector body 102 may act as a pivot point when externally acting forces, such as bending moments, act on a connected pipe 106.

It has been found that by minimising the radial distance of this point from the pipe 106 can greatly reduce the impact of said external forces on the integrity of the metal-to-metal seal between the free end of the pipe and the connector body. As a result, the likelihood of fluid leakage is greatly reduced.

In the described embodiment, the seal assembly 100 further includes a locating arrangement 156 for ensuring the alignment of the adaptor 115 with respect to the connector body 102, as the second ring 118 is moved in the direction towards the connector body 102. The locating arrangement 156 includes an end face of at first end 134 of the second ring 118 having a plurality of projections 160 configured to envelope an end face 111 at the first and second ends 108, 110 of the connector body 102 during movement of the second ring 118 in the direction towards the connector body 102.

The locating arrangement 156 further ensures that the concentricity of the first ring 116, the second ring 118, the connector body 102 and each inserted pipe 106 is maintained by securing the position of the second ring 118 relative to the connector body 102 when the mechanical interlock arrangement is in the secured condition, as illustrated in FIG. 3. Advantageously, this further ensures that reliable metal-to=metal seal is maintained between the connector body 102 and each inserted pipe 106 even when each pipe 106 may be subject to externally acting forces, such as a bending moment.

In the described embodiment, the projections 160 are configured to envelope an end face at the first and second ends 108, 110 of the connector body 102 during movement of the second ring 118 in the direction towards the connector body 102. In alternative embodiments, the locating arrangement 156 may comprise a projection (or a plurality of projections) configured to be received within a second recess (or plurality of recesses) located in the end face 111 of the first and second ends 108, 110 of the connector body 102. Said second recesses may extends continuously around the circumference of the end face 111 of each of the first and second ends 108, 110 of the connector body 102. The second recess may be concentric with the first recess 150, and may be arranged evenly or unevenly around the circumference of the end face 111 of each of the first and second ends 108, 110 of the connector body 102.

In the described embodiment, the projections 160 of the locating arrangement 156 comprise a series of castellations. The projections 160 extend laterally from the first end 134 of the second ring 118, and are distributed at evenly spaced intervals around the first end 134 of the second ring 118. Advantageously, distributing the projections 160 at regular intervals around the circumference of the first end 134 of the second ring 118 ensures that should an external force, such as a bending moment, act on a pipe 106 inserted into the connector body 102, the load is more evenly distributed around the interface between the second ring 118 and the connector body 102. The even distribution of said force therefore greatly reduces the likelihood that the concentricity of the first ring 116, the second ring 118, the connector body 102 and each inserted pipe 106 relative to one another will be lost, and as such, greatly reduces any negative impact on the integrity of the metal-to-metal seal between the connector body 102 and the free end of each pipe 114.

In the described embodiment, the castellations 160 are arcuate. It has been found that by providing arcuate castellations, such a configuration further distributes said externally acting force more evenly across each projection 160. Advantageously, the likelihood that any one projection 160 may fail and break away from the second ring 118 under the action of such a force, is greatly reduced.

In alternative embodiments the projections 160 of the locating arrangement 156 may be non-arcuate castellations, and in addition, may not be castellated. Furthermore, the projections may instead be a single continuous projection extending continuously around the circumference of the end face 111 of each of the first and second ends 108, 110 of the connector body 102.

Referring again to FIG. 4 in particular, the mechanical interlock arrangement 104 further includes a fastening arrangement 162. The fastening arrangement 162 is configured such that fastening of the fastening arrangement 162 acts to pull the connector body 102 in the direction of the adaptor 115 (i.e. towards the secured position), and at the same time, move the second ring 118 in the direction towards the connector body 102. When the second ring 118 is moved in the direction of the connector body 102 whilst being in contact with the first ring 116, the pipe 106 is driven into the connector body 102 allowing the free end 114 of the pipe 106 to be driven into contact with the side wall 146 of the bore 144. More specifically, the outer surface 148 of the free end 114 of the pipe 106 is driven into contact with the side wall 146 of the bore 144. As a result, a metal-to-metal seal is created between the free end 114 of the pipe 106 and the connector body 102.

The fastening arrangement 162 includes the second ring 118 having a plurality of fasteners 164, and the connector body 102 having a plurality of fastening points 166 configured to receive said fasteners 164. By providing the second ring 118 with a plurality of fasteners 164, and the connector body 102 with a plurality of fastening points 166 configured to receive said fasteners 164, the second ring 118 can be advantageously quickly and easily attached to the connector body 102 upon the mechanical interlock arrangement 104 having been moved fully in the direction of the connector body 102, such that a metal-to-metal seal exists between the connector body 102 and the free end 114 of an inserted pipe 106. In addition, the second ring 118 can be quickly and easily detached from the connector body 102 by virtue of said attachment being releasable, should an operator wish to remove the seal assembly 100.

In the described embodiment the fasteners 164 are threaded bolts. The bolts 164 are arranged such that they penetrate apertures 168 formed in the second ring 118, said apertures extending between the first and second ends 134, 136 of the second ring 118. The bolts 164 are arranged such that the head portion is located adjacent the second end 136 of the second ring, with the threaded shaft penetrating the aperture 168 between the second 136 and first ends 134. In the described embodiment, the fastening points 166 are threaded recesses having a thread configured to correspond to that of the fasteners 164, and are provided in the first and second ends 108, 110 of the connector body 102. In the described embodiment, the fastening points 166 are arranged at evenly spaced intervals around the first and second ends 108, 110 of the connector body 102, at positions that correspond to those of the apertures 168, and as such the fasteners 164, which are arranged at evenly spaced intervals around the circumference of the second ring 118.

Advantageously, distributing the fasteners 164 at regular intervals around the circumference of the second ring 118 ensures that should an external force, such as a bending moment, act on a pipe 106 inserted into the connector body 102, the load is more evenly distributed around the interface between the second ring 118 and the connector body 102. The even distribution of said force therefore greatly reduces the likelihood that the second ring 118 may become detached from the connector body 102, or that the concentricity of the first ring 116, the second ring 118, the connector body 102 and each inserted pipe 106 relative to one another will be detrimentally affected. Such a configuration therefore greatly reduces any negative impact of such an external force on the integrity of the metal-to-metal seal between the connector body 102 and the free end 114 of each pipe 106.

Upon complete fastening of the fastening arrangement 162, the second ring 118 is releasably attached to the connector body 102, with the mechanical interlock arrangement 104 fully secured in the secured condition. Advantageously, the metal-to-metal seal between the free end 114 of the pipe 106 and the connector body 102 can be securely and reliably maintained once created, with relative movement between each connected pipe 106 and the connector body 102 minimised.

Each aperture 168, and as such fastener 164, is located such that the position alternates with the position of each projection 160 of the locating arrangement 156. Advantageously, distributing the fasteners 164 and projections 160 at regular, alternating intervals around the circumference of the second ring 118 maximises the stability of the interface between the second ring 118 and the connector body 102, and optimises the distribution of load should an external force, such as a bending moment, act on a pipe 106 inserted into the connector body 102.

Referring now to FIG. 5, in which the seal assembly 100 is shown in a fully secured condition, the second end 110 of the connector body 102 is defined by a second end of the second section 174. At the opposing end, the first end 187 of the second section 174 further includes a mechanical seal arrangement 175 configured for providing a metal-to-metal seal between the first section and the second section.

The seal member of the mechanical seal arrangement 175 is a metallic element 189, which in the described embodiment is in the form of a ring. The metallic element 189 is specifically dimensioned to fit around an outer surface 191 of the first section 172. The metallic element 189 is slidable around the outer surface 191 of the first section 172 in a direction both towards and away from a radially extending end face 193 at the first end 187 of the second section 174 of the connector body 102.

The metallic element 189 includes a projecting portion 195. In the described embodiment, the projecting portion 195 is in the form of a wedge having a laterally extending tapered portion that terminates in an enlarged head portion 197. The tapered portion is defined by an angled surface 198.

The end face 193 at the first end 187 of the second section 174 has a recess 199 configured to receive the projecting portion 195 of the metallic element 189. When the metallic element 189 is moved, in contact with the outer surface 191 of the first section 172 in the direction towards the first end 187 of the second section 174, the projecting portion 195 is received within the recess 199. The recess 199 includes a tapered side surface 151 which defines the depth of the recess 199. The side surface of the recess 199 opposing the tapered side surface 151, is provided by the outer surface 191 of the first section 172. The side surface 151 tapers at an angle different to that of the taper of the projecting portion 195 of the metallic element 189. Consequently, as the projecting portion 195 is received by the recess 199, the enlarged head portion 197 deforms against both the side surface 151 and the outer surface 191 of the first section 172, whilst the angled surface 198 of the projecting portion 195 deforms against the angled side surface 151 of the recess 199. Consequently a metal-to-metal seal is formed between the second section 174 and the mechanical seal arrangement 175, and between the mechanical seal arrangement 175 and the first section 172.

In the described embodiment, the recess 199 has an opening, the radial width of which is substantially 20% of the radial width of the connector body 102. In alternative embodiments, the opening may have a width of another dimension other than 20% of the radial width of the connector body. In the described embodiment, providing the recess 199 with said dimensions allows for the radial width of the second section 174 to be maximised as far as possible. This means that in forming the recess 199, material is not removed from the second section 174 to an extent that may compromise the structural or mechanical integrity of the connector body 102.

In the described embodiment, the recess 199 extends continuously around the circumference of the end face 193 of the first end 187 of the second section 174. In alternative embodiments, the recess 199 may comprise a plurality of individual recesses, arranged evenly or unevenly around the circumference of the end face 193.

As illustrated in FIGS. 4 and 5, the second section 174 is configured such that the recess 199 is located adjacent the outer surface 191 of the first section 172. As shown in FIG. 5, when the mechanical seal arrangement 175 is in the secured condition, this allows the interconnection between the projecting portion 195 of the metallic element 189 and the recess 199 to be located adjacent the outer surface of the first section 172. Such a configuration ensures that the concentricity of the first section 172, the second section 174 and the metallic element 189 is maintained. This is particularly important for maintaining the integrity of the metal-to-metal seal once the seal assembly is operational and conveying fluid between two pipes.

When the mechanical seal arrangement 175 is secured with respect to the connector body 102 (i.e. in the secured condition), the interconnection between the projecting portion 195 of the metallic element 189 and the recess 199 may act as a pivot point when externally acting forces, such as bending moments, act on a connected pipe 106.

It has been found that minimising the radial distance of this point from the outer surface 191 of the first section 172 can greatly reduce the impact of said external forces on the integrity of the metal-to-metal seal created between the mechanical seal arrangement 175 and the first and second sections 172, 174 of the connector body 102. As a result, the likelihood of fluid leakage is greatly reduced.

The mechanical seal arrangement 175 further includes a fastening arrangement for applying a force to the metallic element 189, in order to drive the metallic element 189 into sealing engagement with the second section 174. The fastening arrangement is configured such that fastening of the fastening arrangement acts to pull the metallic element 189 in the direction of the first end 187 of the second section 174. The fastening arrangement includes the metallic element 189 having a plurality of fasteners 153, and the second section 174 having a plurality of fastening points 155 configured to receive said fasteners 153. By providing the metallic element 189 with a plurality of fasteners 153, and the second section 174 with a plurality of fastening points 155 configured to receive said fasteners 153, the mechanical seal arrangement 175 can be advantageously quickly and easily attached to the second section 174 such that a metal-to-metal seal is created between the first section 172 and the second section 174. In addition, the mechanical seal arrangement 175 can be quickly and easily detached from the second section 174 by virtue of said attachment being releasable, should an operator wish to remove the seal assembly 100.

In the described embodiment, the fasteners 153 are threaded bolts. The bolts 153 are arranged such that they penetrate apertures 157 formed in the metallic element 189, said apertures 157 extending between first and second ends 159, 161 of the metallic element 189. The bolts 153 are arranged such that the head portion is located adjacent the second end 161 of the metallic element 189, with the threaded shaft penetrating the aperture 157 between the second 161 and first end 159. In the described embodiment, the fastening points 155 are threaded recesses having a thread configured to correspond to that of the fasteners 153, and are provided in the first end 187 of the second section 174. In the described embodiment, the fastening points 155 are arranged at evenly spaced intervals around the first end 187 of the second section 174, at positions that correspond to those of the apertures 157, and as such the fasteners 153, which are arranged at evenly spaced intervals around the circumference of the metallic element 189.

Advantageously, distributing the fasteners 153 at regular intervals around the circumference of the metallic element 189 ensures that should an external force, such as a bending moment, act on a pipe 106 inserted into the connector body 102, the load is more evenly distributed around the interface between the metallic element 189 and the second section 174. The even distribution of said force therefore greatly reduces the likelihood that the metallic element 189 may become detached from the second section 174, or that the concentricity of the metallic element 189, the first section 172, the second section 174 and each inserted pipe 106 relative to one another will be detrimentally affected. Such a configuration therefore greatly reduces any negative impact of such an external force on the integrity of the metal-to-metal seal between the metallic element 189 and the first and second sections 172, 174.

Referring now to FIGS. 4 and 5 in particular, the seal assembly 100 further includes a first cap 176 and a second cap 178, arranged to cooperate with the adaptors 115 located at the first and second ends 108, 110 of the connector body 102 respectively. Each cap 176, 178 is configured to cooperate with the corresponding adaptor 115 and an outer surface 180 of the second section 174 for further assuring the position of the each adaptor 115 with respect to the connector body 102. In the described embodiment, the first cap 176 (the tension cap) functions as both a protective cover and a secondary fastening arrangement. When the first cap 176 is in the secured condition, the first cap 176 acts to prevent movement of the adaptor 115 at the first end 108 of the connector body 102 in a direction away from the connector body 102, when the corresponding mechanical interlock arrangement 104 is in the secured condition. In addition, the first cap 176 acts to maintain the concentricity of the first ring 116 and second ring 118 of the adaptor 115 with the connector body 102 and an inserted pipe 106, which advantageously ensures that a reliable metal-to-metal seal is maintained between the connector body 102 and the inserted pipe 106, even when the pipe 106 may be subject to externally acting forces, such as a bending moment.

In the described embodiment, the second cap 178 functions primarily as a protective cover, to protect the second end of the connector body 102 from the ingress of dirt, dust and water. In alternative embodiment, the second cap 178 may also function as a tension cap, and act to prevent movement of the adaptor 115 at the second end 110 of the connector body 102 in a direction away from the connector body 102, when the corresponding mechanical interlock arrangement 104 is in a secured condition.

Each of the first and second caps 176, 178 has a substantially cylindrical form, and comprises an open end 182 and a substantially closed end 184. In the described embodiment, the substantially closed end 184 of the first cap 176 is configured to be located at the first end 108 of the connector body 102, and the substantially closed end of the second cap 178 is configured to be located at the second end 110 of the connector body 102. In each case the open ends 182 of each of the first and second caps 176, 178 are configured to project in the direction of the opposing end of the connector body 102.

The substantially closed end 184 of each cap 176, 178 includes an end wall 186 having an aperture 188. The aperture 188 is configured to receive the free end 114 of a pipe 106. In each case, the free end 114 of a pipe 106 is inserted into said aperture 188 before the free end 114 of each pipe 106 is received by the connector body 102.

The first cap 176 has a bore 190 which is accessible through the open end 182 of the cap 176. The open end 182 is configured to receive the first end 108 of the connector body 102, such that the majority of the connector body 102 is then held within the bore 190 of the first cap 176. The bore 190 of the first cap 176 is defined by an inner circumferential surface 192. The inner surface 192 has a screw thread 194 corresponding to a complementary screw thread provided on a portion of the outer surface 180 of the second section 174 of the connector body 102, located adjacent the mechanical seal arrangement 175. When the first end 108 of the connector body 102 is inserted into the open end 182 of the first cap 176, the connector body is further received within the bore 190 of the cap 176 as a result of relative rotational motion therebetween.

The second cap 178 also has a bore 190 which is accessible through the open end 182 of the cap 178. The open end 182 is configured to receive the second end 110 of the connector body 102, such that the mechanical arrangement 104 and a threaded neck portion 196 at the second end 110 of the connector body 102 is then held within the bore 190. The bore 190 of the second cap 178 is defined by an inner circumferential surface 192. The inner surface 192 has a screw thread 194 corresponding to a complementary screw thread provided on the threaded neck portion 196 of the second section 174 of the connector body 102. When the first end 108 of the connector body 102 is inserted into the open end 182 of the first cap 176, the connector body is further received within the bore 190 of the cap 176 as a result of relative rotational motion therebetween.

In the described embodiment, the screw threads 194 of each of the inner surfaces 192 of the first and second caps 176, 178, and of the outer surface 180 and the threaded neck portion 194 of the second section 174 of the connector body 102 are a ¼" ACME thread. In alternative embodiments an alternative configuration of thread may be provided, or indeed, an alternative appropriate method of securing the position of the first cap 176 and the second cap 178 with respect to the connector body 102 may be employed.

Upon rotation of each of the first and second caps 176, 178 with respect to the connector body 102, the first and second ends 108, 110 of the connector body 102 are drawn into the bores 190 of the first and second caps 176, 178 respectively. The first end 108 of the connector body 102 is drawn towards an internal surface 173 of the end wall 186 of the substantially closed end 184 of the first cap 176. The internal surface 173 of the end wall 186 has a stepped profile, defining first and second radially extending abutment surfaces 177, 179. The first abutment surface 177 of the end wall 186 is configured to abut the second end 136 of the second ring 118 of the adaptor 115, and the second abutment surface is configured to abut the bolt 153 of the fastening arrangement of the mechanical seal arrangement 175, as the first end 108 of the connector body approaches the end wall 186 of the first cap 176 during relative rotational motion between the cap 176 and the connector body 102. Abutment between the second end 136 of the second ring 118 of the adaptor 115 and the first abutment surface 177 of the end wall 186 ensures that when the seal assembly 100 is in use, the first cap 176 acts to resist tension imparted on the components of the adaptor 115 and mechanical interlock arrangement 104, and prevents movement of the adaptor 115 in a direction away from the connector body 102, when the corresponding mechanical interlock arrangement 104 is in the secured condition.

Upon rotation of the second cap 178 with respect to the connector body 102, the second end 110 of the connector body 102 is drawn towards an internal surface 181 of the end wall 186 of the substantially closed end 184 of the second cap 178. The internal surface 181 of the end wall 186 defines a radially extending abutment surface 181a configured to abut the second end 136 of the second ring 118 of the adaptor 115 at the second end 110 of the connector body 102, as the second end 110 of the connector body approaches the end wall 186 of the second cap 178 during relative rotational motion between the cap 178 and the connector body 102.

Relative motion between each of the first and second caps 176, 178 and the connector body 102 can be achieved through rotation of each cap 176, 178 by hand, and through the use of a C-spanner (or other appropriate spanner or wrench). To this end, spanner jacking points 183 are provided around the outer circumference of each of the first and second caps 176, 178, at a location in close proximity to the substantially closed end 184.

Each of the first and second caps 176, 178 provides a protective cover for substantially protecting the seal assembly 100 from impact damage, and from the ingress of dust and dirt. In order that adaptor 115, each mechanical interlock arrangement 104, and the mechanical seal assembly may be maintained in an operative condition whilst the first and second caps 176, 178 are in a secured condition, each of the first and second caps 176, 178 has a grease nipple port 185, also provided at a location in close proximity to the substantially closed end 184. The grease nipple ports 185 provide an inlet through which grease or an equivalent lubricant may be injected.

Although the seal assembly is described as having substantially identical adaptors and mechanical interlock arrangements in association with each of said first and second sections of the connector body, exemplary embodiments (not illustrated) may employ alternative mechanisms for creating and maintaining a seal between the free end of a pipe and the open end at one or both of said first and second portions of the connector body.

In exemplary embodiments, one or both of said seals between a respective first or second portion of the connector body and the free end of a respective pipe may be a non metal-to-metal seal.

Throughout the description and claims of this specification, the words "comprise" and "contain" and variations of the word, for example "comprising" and "comprises", means "including, but not limited to", and it is not intended to (and does not) exclude other moieties, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or compounds described in conjunction with a particular aspect, embodiment or example of the invention are to be understood as be applicable to any other aspect, embodiment or example described herein unless incompatible therewith.

The invention claimed is:

1. A seal assembly for a pipe, the seal assembly comprising:
   a connector body having a first section, and a second section, movable relative to one another;
   wherein the first section and the second section each has an open end configured for receiving a free end of a pipe; wherein the open end of the first and second sections are each configured for sealing engagement with the free end of a respective pipe; and
   wherein the seal assembly is movable between a first condition, in which the second section assumes a retracted position relative to the first section, and a second condition in which the second section assumes an extended position relative to the first section, and wherein a seal member is provided for creating a seal between the first section and the second section in said first and second conditions;
   wherein the seal assembly is configured to prevent or limit further axial movement between the first section and the second section in said first and second conditions;

wherein the seal assembly comprises first and second adaptors, each adaptor being provided for association with a respective one of said first and second sections of the connector body and configured for securing at the free end of the respective pipe; and wherein the seal assembly further comprises first and second mechanical interlock arrangements, each provided for association with a respective one of said first and second adaptors, and each configured for driving the respective adaptor in the direction of the connector body.

2. A seal assembly according to claim 1, wherein the seal member is configured to be located substantially between the first section and the second section; and/or wherein the seal member is configured for providing a seal between an outer surface of the first section and an inner surface of the second section.

3. A seal assembly according to claim 1, wherein the seal member is a metallic element specifically dimensioned to fit around an outer surface of the first section, and wherein the metallic element is configured to be driven into engagement with the second section, such that a metal-to-metal seal is created between the second section and the metallic element, and between the metallic element and outer surface of the first section.

4. A seal assembly according to claim 3, wherein the angled surface of the first section is provided on an inner surface of a recess, wherein said recess is configured to receive the wedge of the metallic element when the metallic element is driven into engagement with the second section.

5. A seal assembly according to claim 3, wherein the assembly includes a mechanical seal arrangement comprising a fastening arrangement for applying a force to the metallic element, in order to drive the metallic element into sealing engagement with the second section.

6. A seal assembly according to claim 5, wherein the fastening points comprise a plurality of recesses, configured to align with the fasteners and to releasably attach to said fasteners during movement of the metallic element in a direction towards the second section.

7. A seal assembly according to claim 3, wherein said angled surfaces have different angles.

8. A seal assembly according to claim 1, wherein each adaptor comprises a first ring, configured to be mounted around a circumference of the free end of each pipe, and a second ring configured to cooperate with each first ring, in order to drive each first ring into engagement with an outer surface of a respective pipe.

9. A seal assembly according to claim 8, wherein each first ring comprises a first radial stop surface, arranged for engagement by each respective second ring, to limit movement of each second ring in a direction towards the connector body.

10. A seal assembly according to claim 8, wherein each of the first and second sections includes a first recess, and wherein a first end of each first ring is configured to nest within each recess when each second ring is driven in the direction of the connector body.

11. A seal assembly according to claim 8, wherein each of the first and second sections has a substantially cylindrical form defined by a circumferential side wall, wherein said side wall has an end face having a stepped profile which defines each first recess, and wherein an innermost wall of each first recess is adjacent a bore of the connector body.

12. A seal assembly according to claim 8, wherein an inner surface of each first ring is non-planar, and is configured to securely engage with the outer surface of a respective pipe.

13. A seal assembly according to claim 1, wherein each adaptor further comprises a locating arrangement for ensuring the alignment of the respective adaptor with the connector body, as each second ring is moved in the direction towards the connector body.

14. A seal assembly according to claim 1, wherein the open end of each of said first and second sections of said connector body includes a seal surface, and wherein each mechanical interlock arrangement is configured for creating a seal between a respective pipe and the respective seal surface of connector body.

15. A seal assembly according to claim 1, wherein each mechanical interlock arrangement is configured for preventing or limiting axial movement of the connector body relative to the free end of a respective pipe.

16. A seal assembly according to claim 1, wherein each of said first and second sections of the connector body comprises a bore arranged for receiving the free end of the pipe, and wherein the seal assembly is configured for creating a seal between a side wall of said bore and a free end of a respective pipe.

17. A seal assembly according to claim 1, wherein each mechanical interlock arrangement further comprises a fastening arrangement for driving a free end of a respective pipe into the respective open end of the connector body to create the seal therebetween.

18. A seal assembly according to claim 1, wherein each of the first and second sections has a cap for further securing the position of the adaptor of each of the first and second sections with respect to the connector body.

19. A seal assembly according to claim 18, wherein each cap further comprises an abutment surface configured to abut the adaptor of the respective first or second sections, for securing the adaptor with respect to the connector body.

20. A method of connecting two pipes in fluid communication, the method comprising:

providing two pipes, each pipe having a free end, inserting the free end of the first pipe through an aperture provided at a first end of a first cap, and inserting the free end of the second pipe through an aperture provided at the first end of a second cap, preparing the outer surface of each pipe such that a first ring of an adaptor may be secured thereon, locating the adaptor on the free end of each pipe such that a first ring of each adaptor is securely engaged with the prepared outer surface of each pipe, locating the free end of the first pipe within an opening of a first section of a connector body, telescopically extending a second section of the connector body with respect to the first section of the connector body, and locating the free end of the second pipe within an opening of the second section of the connector body, driving the free ends of said pipes into sealing engagement with the first and second sections respectively, by moving a second ring of each adaptor in the direction of the connector body, providing each pipe with a mechanical interlock arrangement comprising a fastening arrangement, and securing the free end of each pipe with respect to the connector body to prevent or limit axial movement of each pipe with respect to the connector body by fastening each of said fastening arrangements, providing a seal member for creating a metal-to-metal seal between the first section and the second section, and providing said seal member with a fastening arrangement, securing the position of the first section of the connector body with respect to the second section connector body to both create the metal-to-metal seal therebetween and to prevent or limit further axial movement therebetween, securing the first and second caps such that the second section of the connector body is substantially enveloped, and the first and second mechanical interlock arrangements are further secured with respect to the connector body.

21. A seal assembly for a pipe, the seal assembly comprising:

a connector body having a first section, and a second section, movable relative to one another;

wherein the first section and the second section each has an open end configured for receiving the free end of a pipe; wherein the open end of the first and second sections are each configured for sealing engagement with the free end of a respective pipe;

wherein the seal assembly is movable between a first condition, in which the second section assumes a retracted position relative to the first section, and a second condition in which the second section assumes an extended position relative to the first section, and wherein a seal member is provided for creating a seal between the first section and the second sections in said first and second conditions; and wherein the seal member is configured for providing a metal-to-metal seal between the first section and the second section; wherein the seal member is a metallic element specifically dimensioned to fit around an outer surface of the first section, and wherein the metallic element is configured to be driven into engagement with the second section, such that the metal-to-metal seal is created between the second section and the metallic element, and between the metallic element an outer surface of the first section.

* * * * *